United States Patent [19]

Katakura et al.

[11] Patent Number: 5,261,281
[45] Date of Patent: Nov. 16, 1993

[54] ULTRASONIC IMAGING APPARATUS

[75] Inventors: Kageyoshi Katakura, Tokyo; Shin-ichi Kondo, Kodaira; Hiroshi Ikeda, Hachioji, all of Japan

[73] Assignee: Hitachi Medical Corporation, Tokyo, Japan

[21] Appl. No.: 974,661

[22] Filed: Nov. 12, 1992

Related U.S. Application Data

[63] Continuation of Ser. No. 606,726, Oct. 31, 1990, abandoned.

[30] Foreign Application Priority Data

Nov. 1, 1989 [JP] Japan ................................. 1-282973

[51] Int. Cl.⁵ ............................................. G01N 29/24
[52] U.S. Cl. .................... 73/626; 128/660.01
[58] Field of Search ................. 73/626, 625, 602, 603; 128/661.01

[56] References Cited

U.S. PATENT DOCUMENTS

| | | | |
|---|---|---|---|
| 3,815,409 | 6/1974 | Macouski | 73/625 |
| 4,019,169 | 4/1977 | Takamizawa | 73/626 |
| 4,140,022 | 2/1979 | Maalak | 73/626 |
| 4,325,257 | 4/1982 | Kino et al. | 73/626 |
| 4,330,875 | 5/1982 | Tachita et al. | 73/626 |
| 4,542,746 | 9/1985 | Takamizawa | 73/626 |
| 4,959,998 | 10/1990 | Yano | 73/626 |
| 4,974,211 | 11/1990 | Corl | 73/626 |

*Primary Examiner*—Tom Noland
*Assistant Examiner*—Rose M. Finley
*Attorney, Agent, or Firm*—Antonelli, Terry, Stout & Kraus

[57] ABSTRACT

A phase adjustment circuit for use in an ultrasonic apparatus which respectively time-adjusts a plurality of received signals from an ultrasonic transducer array and sets wave fronts of the reflected waves from particular positions into an in-phase state and adds the in-phase signals, thereby obtaining a received beam. The received signals are mixed with phase-controlled reference signals. The low frequency component of the mixed wave is sequentially sampled and stored in a memory which is controlled by a clock signal of a predetermined period, and thereafter, the stored sampled signals are read out. Most of the necessary time adjustment results from the difference between the writing time and the reading time. The remaining micro time adjustment is performed by phase control of the reference signals.

9 Claims, 6 Drawing Sheets

FIG. 1
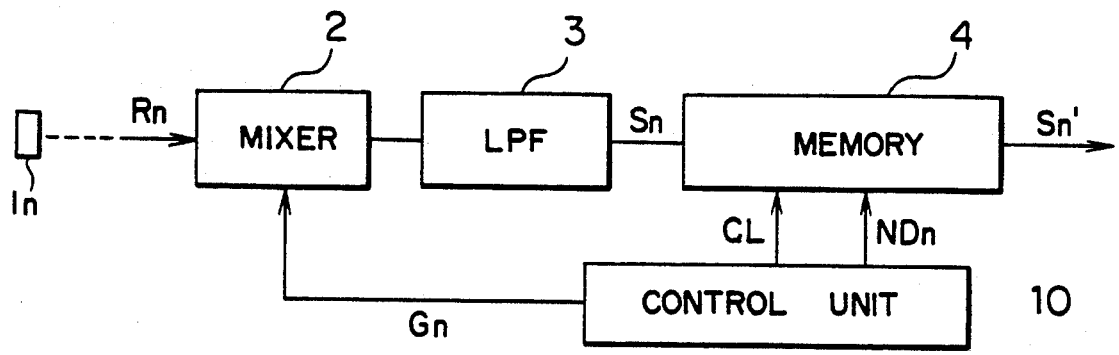
FIG. 2
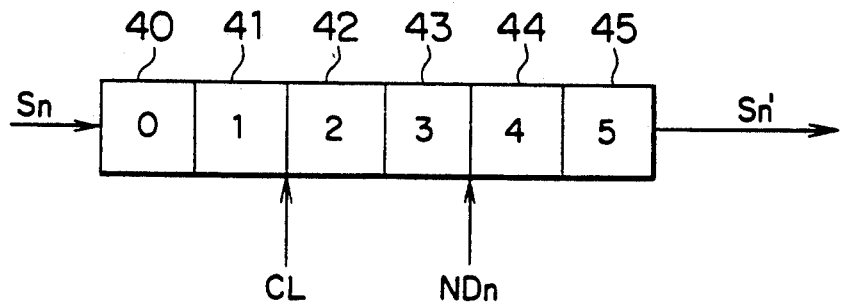
FIG. 3A
| TIME t | 0 | T | 2T | 3T | 4T | 5T | 6T | 7T | ... |
|---|---|---|---|---|---|---|---|---|---|
| WA | 0 | 1 | 2 | 3 | 4 | 5 | 0 | 1 | ... |
| RA | 5 | 0 | 1 | 2 | 3 | 4 | 5 | 0 | ... |
FIG. 3B
| TIME t | 0 | T | 2T | 3T | 4T | 5T | 6T | 7T | ... |
|---|---|---|---|---|---|---|---|---|---|
| WA | 0 | 1 | 2 | 3 | 4 | 5 | 0 | 1 | ... |
| RA | 3 | 4 | 5 | 0 | 1 | 2 | 3 | 4 | |

ULTRASONIC IMAGING APPARATUS

This application is a continuation application of Ser. No. 07/606,726, filed Oct. 31, 1990 now abandoned.

BACKGROUND OF THE INVENTION

The present invention relates to an ultrasonic apparatus which executes an in-phase cumulation with respect to a wave front of a reflected wave from a desired position for a group of received signals from an array of transducers and, more particularly, to an imaging apparatus for obtaining an ultrasonic echogram.

An apparatus which sequentially selects elements of a transducer array and executes an in-phase cumulation of the receiving signals of the selected elements so as to obtain an in-phase state with respect to a reflected wave from a desired position is widely used in place of an imaging apparatus which sequentially obtains ultrasonic echograms by mechanically scanning a single transducer having a high directivity. Further, the in-phase cumulation technique is also used in the field of flow rate detection using the Doppler shift and the field of ultrasonic detection in order to control a point response function, in other words, to form a receiving beam having desired spatial characteristics.

Generally, the received beam is formed by respectively leading reception signals from a plurality of transducer elements to an analog delay line and by adding the delayed signals. In an apparatus disclosed in U.S. Pat. No. 4,140,022, low frequency signals are produced by respectively mixing reference signals of the phases corresponding to the delays to be added to signals from the transducer elements, and the reception signals and the low frequency signals are respectively led to an analog delay line and are added.

SUMMARY OF THE INVENTION

In ultrasonic imaging, sequential scanning or steering processes of the received beam are necessary. On the other hand, there are many apparatuses which execute a sequential change of focal distances of the received beams. It is necessary to change the delay time which is applied to the signal from each element in order to change the received beams. Therefore, such conventional apparatus uses an analog delay line having a number of taps. The scale and cost of the delay line and the switches for switching the taps are very large. In spite of such a situation, there are many cases where the accuracy of the delay time is insufficient.

It is, therefore, an object of the invention to provide an ultrasonic apparatus having a beam forming circuit to freely change the received beams by a small circuit scale.

Another object of the invention is to provide an ultrasonic apparatus having a beam forming circuit with sufficient high time accuracy.

To form a beam from a plurality of received signals, it is unnecessary to delay the signal waveform itself, but it is sufficient that the signals be sampled in substantially an in-phase state.

It is a feature of the invention that each of a plurality of received signals is mixed with reference signals, low frequency components of the mixed waves are sampled and stored, and the stored signals are respectively read out and added, and that most of the necessary time adjustment is executed by the difference between the writing time and the reading time of each of the received signals and remaining micro time adjustments, that is, different micro time adjustments among the signal channels are executed by the phase control of each of the reference signals.

The received signals are sampled and stored by a memory device such as an analog memory or the like. The analog delay line in the conventional apparatus is unnecessary. The sampling time is controlled by clocks signals which are digitally generated. Thus, the time accuracy is improved. The micro time is corrected by the phase control of the reference signal waveforms. Therefore, the beam forming with sufficient time accuracy can be achieved by a construction such that the reception signals are sampled by clocks signals of a low speed. On the other hand, since synchronous sampling of multi-channels can be performed, it is also advantageous from a viewpoint of the S/N ratio. Further, by optimizing the operation of the analog memory, the switching circuit also becomes unnecessary.

BRIEF DESCRIPTION OF THE DRAWINGS

FIG. 1 is a circuit diagram showing a fundamental unit construction of each embodiment of the invention;

FIGS. 2 and 4 are circuit diagrams showing practical constructions of a memory section in the circuit of FIG. 1;

FIGS. 3A and 3B are conceptual diagrams showing the operation of FIG. 2;

FIG. 4 is a more detailed circuit diagram showing a practical construction of the memory section of FIG. 2.

DESCRIPTION OF THE PREFERRED EMBODIMENTS

An embodiment of the invention will be described in detail hereinbelow with reference to the drawings.

FIG. 1 shows a construction of a time adjusting circuit (construction of a unit circuit) for one channel of received signals in a beam forming circuit according to the embodiment of the invention. That is, a received signal $R_n$ from an n-th transducer element $1_n$ is input to a mixer 2 directly or through a pre-amplifier (not shown). The reception signal of one channel is typically a reception signal from one element of a transducer array. However, there is also an apparatus in which signals from a plurality of elements to be subjected to the same phase shift process are combined into the signal of one channel and, thereafter, the combined signal is input to the mixer 2. The reception signal $R_n$ is mixed by the mixer 2 with a reference signal $G_n$ whose phase was controlled so as to match with the phase of the reception signal. A high frequency component of the sum of the frequencies of both of the reception signal and the reference signal and a differential frequency component between them are generated by the mixing process. However, by passing those frequency components through a low pass filter 3, only the differential frequency component is derived as an output signal $S_n$ of the low pass filter 3. The output signal $S_n$ is stored in a memory 4 at a predetermined clock interval T.

FIG. 2 shows a construction of the memory 4. The memory 4 has a plurality of (six in the embodiment) memory elements 40 to 45. Signals at input terminals of the memory elements are sequentially sampled by clock signals CL of the interval T and are cyclically written into a plurality of memory elements. That is, write addresses circulate with every clock signal. On the other hand, the reading operation is also cyclically executed every interval T of the clock signal CL. However, there is a difference between a write address WA and a read address RA, as shown by only the number indicated by control data $ND_n$. FIG. 3A shows changes of the write address WA and read address RA in the case where $ND_n=1$ with the passage of time. It will be understood from FIG. 3A that the old stored values are read out only for one clock signal interval T. FIG. 3B shows changes of the write address WA and read address RA in the case where $ND_n=3$, and it will be understood that the old stored values are read out only for a 3-clock signal interval 3T. As mentioned above, the old data can be obtained for only a time interval of $ND_n \cdot T$ with respect to the sampling time. The time adjustment of the signal can be executed on a unit basis of the time interval T by the value of $ND_n$.

Figure 4:
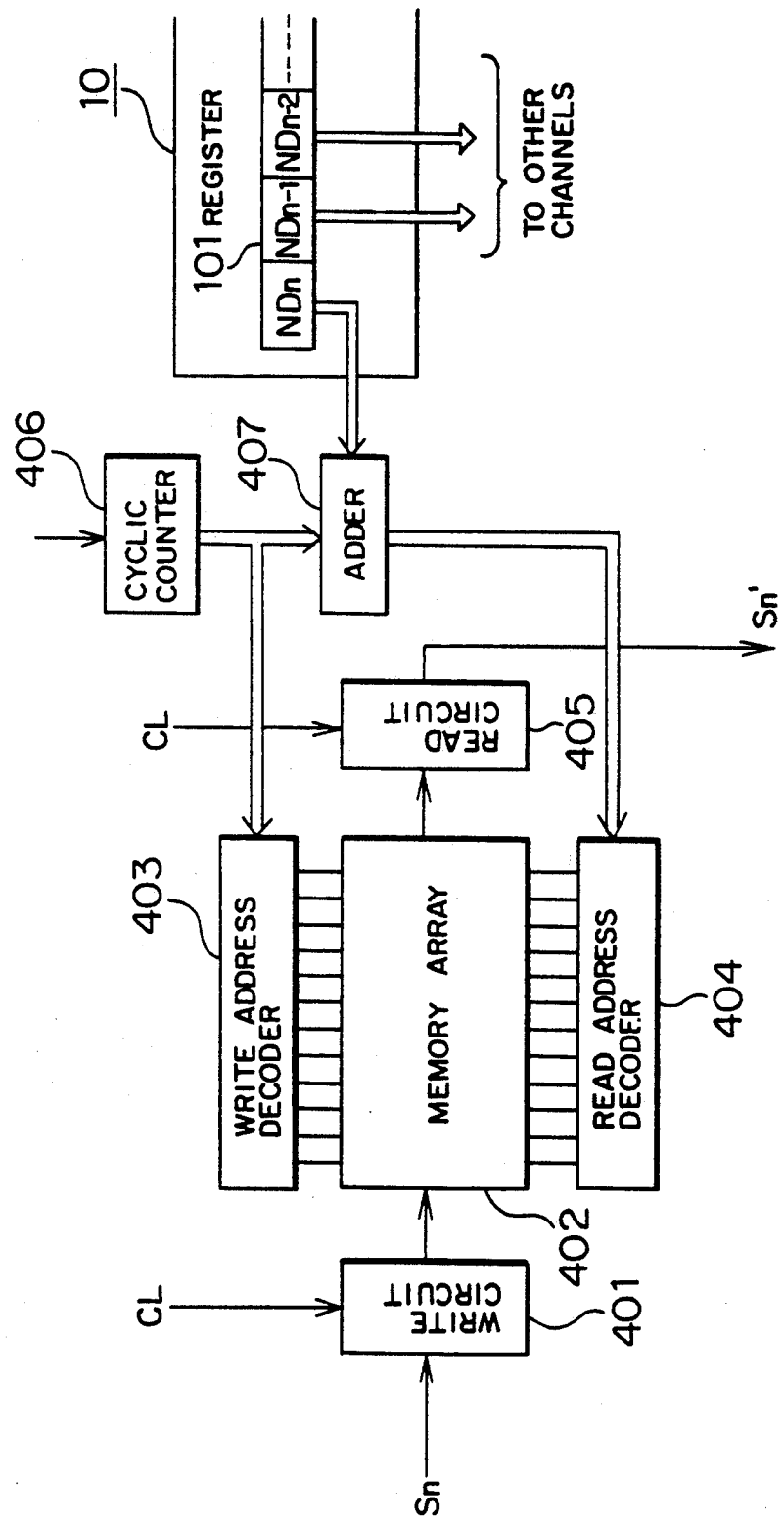

FIG. 4 shows a circuit construction of the memory 4 in FIG. 2 further in detail. A cyclic counter 406 counts the clock signals CL and forms write addresses of a memory array 402 and gives them to a write address decoder 403. A write circuit 401 samples the signal $S_n$ every clock interval of the clock signal CL and writes the sampled signal into the memory elements of the addresses which are selected by the decoder 403. On the other hand, a reading circuit 405 reads the content of the memory element of the address which is selected by a read address decoder 404 every clock interval CL. The value of the read address is formed by adding the value of the control data $ND_n$, which was read out of a register 101 provided in a control unit 10, and an output of the cyclic counter 406 in an adder 407. The cyclic storage and the time-adjusted reading operation as described in FIGS. 3A and 3B are executed by the circuit as mentioned above.

Explanation will be made with reference to FIG. 1 again. In addition to the time adjustment of the interval T by the control data $ND_n$, each phase shifter executes an accurate time adjustment smaller than the interval T by time control of the reference signal $G_n$. That is, the differential frequency component which is obtained from the low pass filter is phase-shifted by only a time $\phi_n$ by the mixing of the mixer 2 in accordance with the phase of the reference signal $G_n$. In the case of a narrow band signal, such a phase shift is considered to be equivalent to the time adjustment, so that this means that the micro time adjustment within the time T was executed for the received signal.

Figure 5:
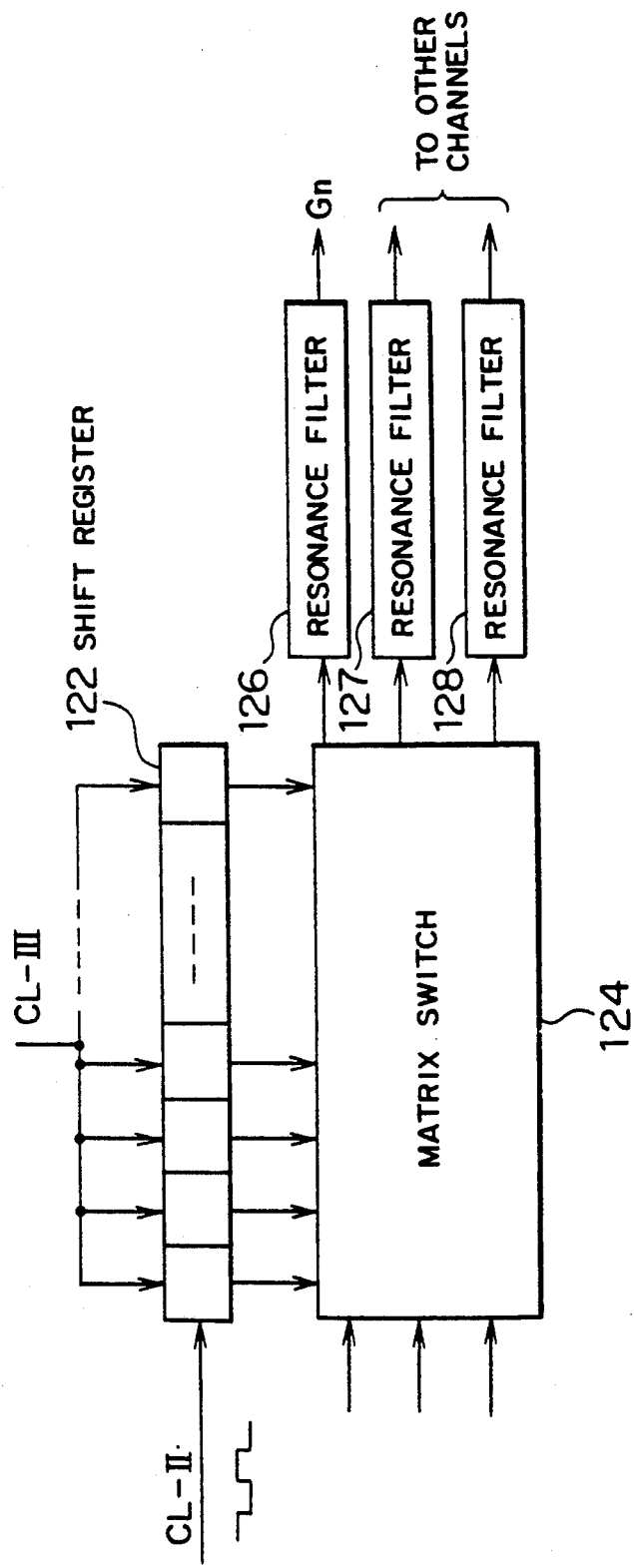
FIG. 5 is a circuit diagram showing a practical construction of a part of a control unit in the circuit of FIG. 1.

FIG. 5 shows a portion of a circuit to generate the reference signals $G_n$ (n=1, 2, ..., n) whose phases are controlled in the control unit 10. A clock signal CL-II of a predetermined frequency $\omega_d$ close to the frequency $\omega_R$ of the received signal is supplied to a shift register 122. The shift register 122 is driven by a clock signal CL-III of a frequency $\omega_c$ which is sufficiently higher than the frequency $\omega_d$. Consequently, a number of clock signals whose period is the same as that of the original clock signal CL-II and whose phases differ by $1/(2\pi\omega_c)$ from one another are obtained from the respective bits of the shift register. A matrix switch 124 selects one of the plurality of clock signals in accordance with the phase shift amount $\phi_n$ which is required for the phase shifters of each channel shown in FIGS. 1 to 4. The selected clock signals are transmitted through resonance filters 126 to 128 each having a resonant frequency of $\omega_d$, so that the reference signals $G_n$ having a sine wave shape are obtained and given to the mixer 2 in each of the phase shifters.

A method of determining the control data $ND_n$ and the phase shift amount $\phi_n$ will now be described. A received signal waveform $R_n(t)$ in each reception channel can be expressed by the following equation.

$$R_n(t) = A_n(t+\tau_n)\cdot\sin[\omega_s(t+\tau_n)] \qquad (1)$$

where, $\omega_s$ denotes the frequency of an ultrasonic wave, $A_n(t)$ indicates the envelope of a response waveform for a pulse transmission wave, and the time origin (t=0) assumes the time point at which a wave front of the reflecting wave arrives at the transducer element existing at the farthest position from a convergent point. To execute the in-phase cumulation, it is necessary to respectively compensate an arrival time point of the wave front at another (for example, the n-th) transducer element, that is, an advanced component $\tau_n$ in arrival time. First, the control data $ND_n$ indicative of the difference between the write address WA and the read address RA of the memory 4 is set to a value which is expressed by the following equation.

$$ND_n = [\tau_n/T] \qquad (2)$$

where, [] denotes the minimum one of the natural numbers which do not exceed the value in [].

On the other hand, if the reference signal for the n-th channel was advanced by only a time $\phi_{dn}$, the resultant reference signal is expressed as follows.

$$G_n = A_0 \sin \omega_d(t+\phi_{dn}) \qquad (3)$$

A low frequency component $S_n(t)$ of the signal which is obtained by the mixing is expressed as follows.

$$S_n(t) = \frac{A_n(t+\tau_n)\cdot A_0}{2} \cos[\omega_s(t+\tau_n) - \omega_d(t+\phi_{dn})] \qquad (4)$$

Further, since the above signal is delayed by only the time of $ND_n \cdot T$ by selection of $ND_n$ and is read out, a signal $S_n'(t)$ which is read out is expressed by the following equation by omitting the term of the envelope.

$$\begin{aligned}S'_n(t) &= \cos[\omega_s(t - ND_n \cdot T + \tau_n) - \omega_d(t - ND \cdot T + \phi_{dn})] \\ &= \cos[(\omega_s - \omega_d)(t - ND_n \cdot T) + \omega_s\tau_n - \omega_d\phi_{dn}]\end{aligned} \qquad (5)$$

The phase-shifted waveforms must be set into the in-phase state with respect to the reception signals $S_n'(t)$ (n=1, 2, 3, ...). For this purpose, it is necessary to set $[-(\omega_s-\omega_d)ND\cdot T + \omega_s\tau_n - \omega_d\phi_{dn}]$ to be constant among the channels. As the simplest method of realizing such a constant state, it is sufficient to use the following equation.

$$-(\omega_s-\omega_d)ND_n\cdot T + \omega_s\tau_n - \omega_d\phi_{dn} = 0 \qquad (6)$$

That is, it is sufficient to advance the phase shift of the reference signal $G_n$ of the n-th channel with respect to the time origin by only the phase amount which is expressed by the following equation.

$$\phi_{dn} = \frac{\omega_s}{\omega_d} (\tau_n - ND_n \cdot T) + ND_n \cdot T \quad (7)$$

Figure 6A:
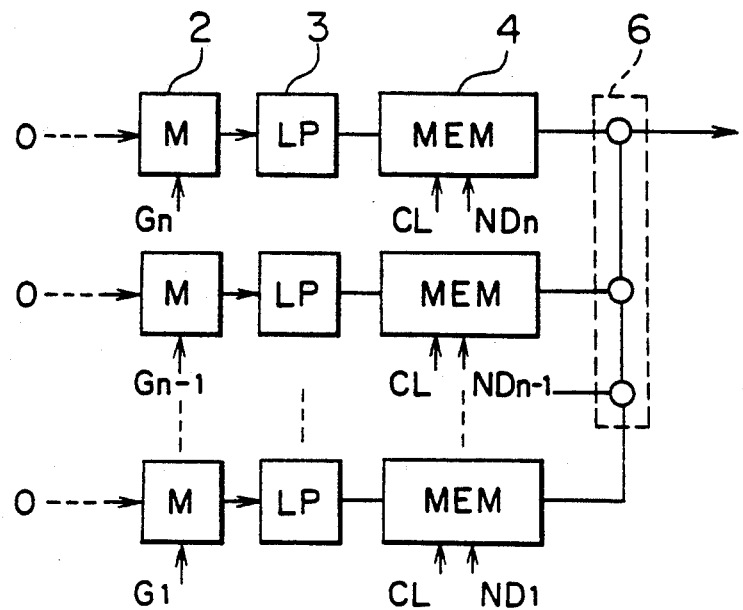
FIGS. 6A and 6B are block diagrams showing a beam former of each embodiment according to the invention.
Figure 6B:
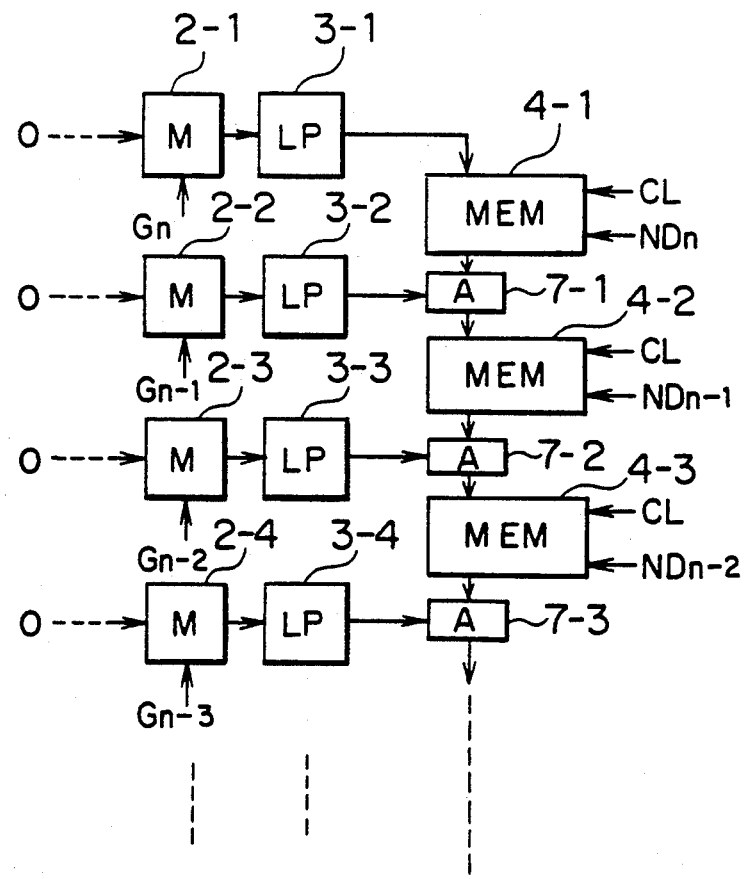

A beam formed according to the wave fronts of the reflected waves from points of desired depths and directions is obtained by adding the time-adjusted reception signals of every reception signal channel. That is, the wave reception using the above points as focal points can be obtained. FIGS. 6A and 6B show practical examples of a beam forming circuit. In the example shown in FIG. 6A, a time adjusting circuit comprising the mixer 2, low pass filter 3, and memory 4 shown in FIG. 1 is provided for every channel. The signals which are read out from the memories 4 of the respective channels at the period T are input to an adder 6 in parallel and are added, thereby obtaining a beam forming output from the adder 6. The phases of the reference signals $G_n$ which are input to the mixer 2 of the channels and the data $ND_n$ (n=1, 2, 3, ...) which are input to the memories 4 are respectively individually determined in accordance with the wave front to be beam-formed. On the other hand, in the construction of FIG. 6B, memories 4-1, 4-2, and 4-3 are cascade-connected through adders 7-1 and 7-2. The reception signal of the n-th channel is subjected to a micro time adjustment by the mixer 2-1 and, thereafter, it is subjected to a time adjustment corresponding to the data $ND_n$ by the memory 4-1. The resultant time-adjusted signal is added by the adder 7-1 to the reception signal of the (n-1)-th channel which was subjected to a micro time adjustment by the mixer 2-2. In a manner similar to the above, each time the time adjustment is executed by the memories 4-2 and 4-3 in a cascade manner, the reception signals of the (n-2)-th and (n-3)-th channels, which were respectively subjected to a micro time adjustment by the mixers, are added by an adder 7-2 and an adder 7-3, thereby making the phases coincident in accordance with the wave front as a whole.

Figure 7:
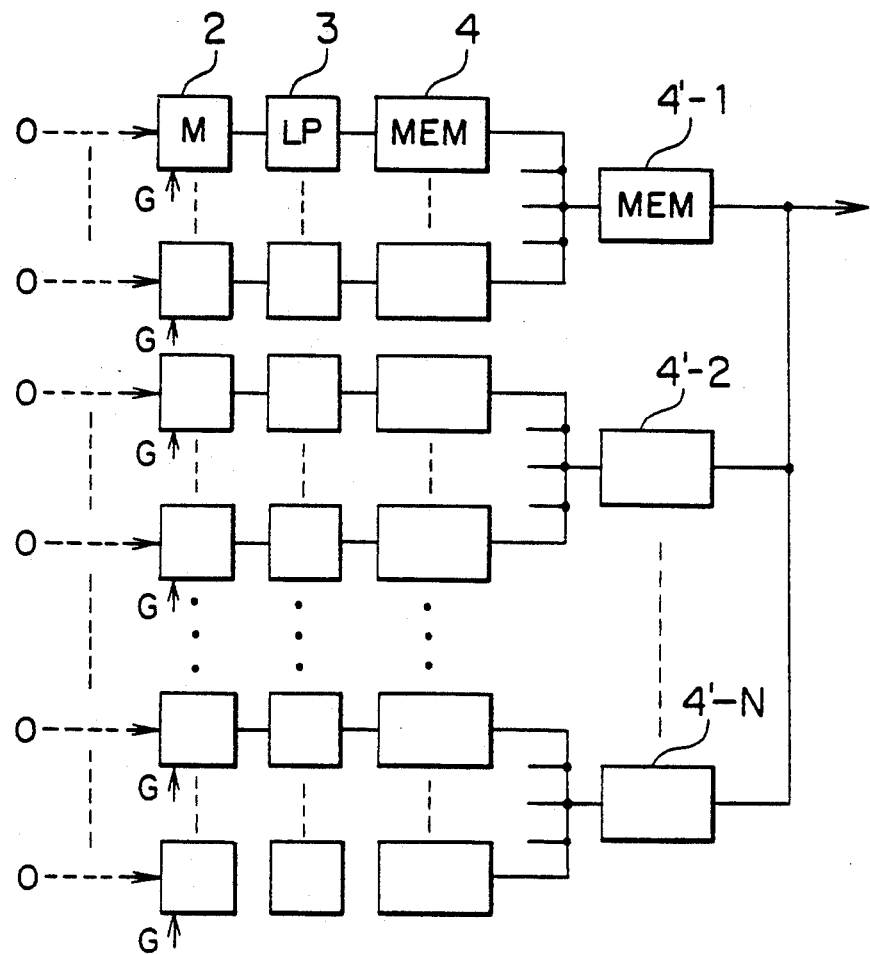
FIGS. 7 to 10 are block diagrams showing beam formers of other embodiments.

Further, the construction comprising a plurality of time adjusting circuits shown in FIG. 6A is used as a fundamental unit and a plurality of groups of such units are provided as shown in FIG. 7. Outputs of the respective groups are input to memories 4'-1, 4'-2, ..., 4'-N at the second stage, respectively, and are again time-adjusted and are added. In this manner, the construction of the apparatus can be simplified by using such a multi-stage construction. In the case of such a multi-state construction, for instance, the portion of the memories of the second stage can be also constructed by cascade-connecting the memories as shown in FIG. 6B.

Figure 8:
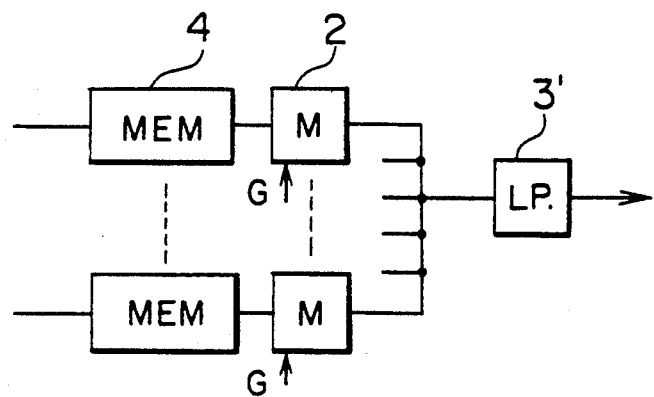

On the other hand, a construction such that the order of the memories and the mixers is reversed as shown in FIG. 8 can also be used in place of the construction of FIG. 1. In this case, since it is sufficient to execute the filtering process after the addition, the low pass filter 3 is arranged after the adding point, and the number of filters necessary can be reduced.

On the other hand, a dynamic focusing construction can be also provided by changing the reference signals G, ND of the MEM, and the like in the construction of FIG. 1 together with the time.

Figure 9:
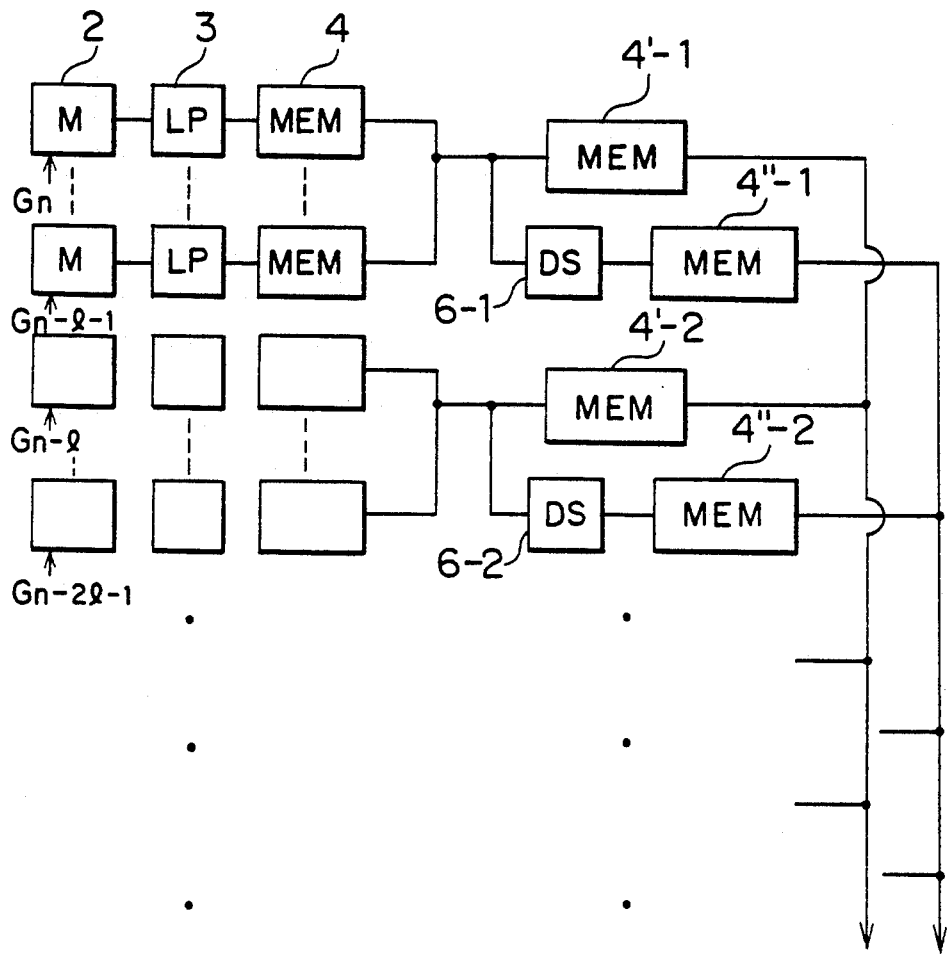

FIG. 9 shows further another embodiment. According to the embodiment of FIG. 9, the beam forming circuits of the double-stage construction shown in FIG. 7 are used as a fundamental circuit, and a plurality of receiving beams of different convergent characteristics are simultaneously obtained in parallel. The outputs of the individual time adjusting circuits of the respective channels each comprising a mixer 2, low pass filter 3, and memory 4 are added for every group and are supplied to the memories 4'-1, 4'-2, ... at the second stage and are also supplied through additional time adjusting circuits 6-1, 6-2, ... to memories 4''-1, to 4''-2, ... at the second stage which are provided as another group. Practical constructions of the memories 4''-1, 4''-2, ... are the same as those of the memories 4'-1, 4'-2, ... as shown and described in FIGS. 2 and 3. The time adjustment is executed on a time T unit basis by setting the control data ND. The summed signal of the outputs which were read out from the memories 4'-1, 4'-2, ... of the first group is used as a received signal of the first beam. The summed signal of the outputs which were read out from the memories 4''-1, 4''-2, ... of the second group is used as a reception signal of the second beam. The difference between the convergent characteristics of the first and second beams is realized by the difference of the set control inputs NS between the memories 4'-1, 4'-2, ... and the memories 4''-1, 4''-2, ... However, the micro phase difference which cannot be covered by the above setting process is obtained by the additional time adjusting circuits 6-1, 6-2, .... The additional time adjusting circuits 6-1, 6-2, ... can be implemented by an analog delay line because it is sufficient to perform a micro phase adjustment. On the other hand, the same construction as the mixer 2 in FIG. 1 can also be used.

A structure such that a plurality of memories are provided to simultaneously form a plurality of groups of beams as described in FIG. 7 can be also applied to the example of FIG. 6A or 6B.

Figure 10:
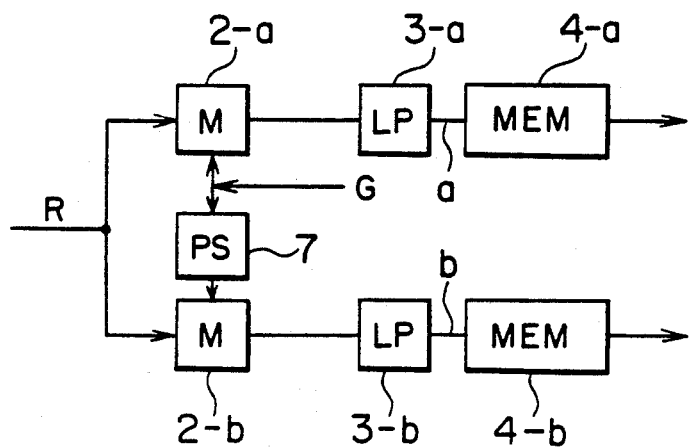

Each of the foregoing embodiments can be applied to the beam forming which can be called an orthogonal sampling beam forming. For this purpose, in each of the embodiments, it is sufficient that two signals having phases which are different by 90° are respectively prepared as reference signals which are used for a signal mixing at the first stage and two beam forming circuits each comprising a mixer, low pass filter, and memory are provided. FIG. 10 shows a practical example of a circuit construction. A received signal R of one channel is separately input to mixers 2-a and 2-b in parallel. The reference signal for a micro time adjustment of this channel is directly given to the mixer 2-a and is also given through a 90°-phase shifter 7 to the mixer 2-b. The low frequency components of the mixed outputs of the mixers 2-a and 2-b are extracted by low pass filters 3-a and 3-b, respectively. Thus, the received signal is subjected to a micro time adjustment and is converted into a complex signal, so that a signal a indicative of the real part and a signal b indicative of the imaginary part are obtained. Each of the received signal channels similarly has a construction using two mixers. As a construction after the memories, two constructions shown in FIG. 6, 7, or 9 are used for the real part signal and the imaginary part signal. The beam forming is independently executed by the real part and the imaginary part. The two signals which were beam-formed are finally synthesized.

Doppler detection can be also obviously executed by the beam forming method described above.

On the other hand, by synchronizing the clock CL for each memory, jumping noises from other channels can be significantly reduced.

In addition, if a switched capacity memory is used as a memory, a circuit of a low electric power consumption can be implemented.

Further, it is also possible to use an analog/digital converter and a digital memory as a memory. In such a case, a beam forming section of a wide dynamic range can be constructed.

There is the following phase relation in the above construction.

$$\omega_s(T-T')-\omega_d T=\phi$$

where, $\phi$: phase shift angle which is shifted by the mixing,
$\omega_d$: reference signal frequency,
$\omega_s$: signal frequency,
$T'$: sampling time
$T$: equal phase surface (target signal incident time) of the reception wave front.

The above phase relation is desirable for an accurate beam formation.

On the other hand, the above construction can be implemented as an integrated circuit because no analog delay line is used. The memory and the mixer can be integrated in the same chip, or the memory, the low pass filter, and the mixer can be also integrated in the same chip in a lump.

By providing a plurality of identical systems and by allowing them to alternately execute the processes, the detecting speed can obviously be further made high.

Since the above system has a construction such that the received signal is stored, the write clock period into the memory and the read clock period therefrom can be different. Particularly, if the read clock frequency is increased n times, this means that the different time adjustments were executed by the read signals of n times, respectively. Therefore, if a plurality of desired signals among them are selected, multiplexing processes such that a plurality of beams are formed by one beam former and the like can be implemented.

What is claimed is:

1. Apparatus for processing signals from a plurality of ultrasonic transducer elements resulting from ultrasonic waves received by the transducer elements, said apparatus comprising:

a plurality of reception channels, each reception channel including a mixer for mixing a signal from a respective ultrasonic transducer element with a time-controlled reference signal, a filter for filtering the mixed signals to produce a low frequency output, and a sampling and memory circuit for periodically sampling the filter output and storing the sampled filter output and for periodically reading out the stored filter output;

control means for providing write addresses and read addresses for the plurality of sampling and memory circuits to cause an addressed sampling and memory circuit to sample and store filter output, with a uniquely selected delay time between storing and reading out by any one of the sampling and memory circuits, said control means further providing reference signals to the plurality of mixers, the reference signal for a respective mixer being dependent upon the selected delay time for that mixer; and adding means for adding the read outputs from the plurality of sampling and memory circuits to provide a received signal.

2. Apparatus as claimed in claim 1, wherein said control means includes clock means for providing clock signals to control the sampling and storing of the associated filter output in the addressed sampling and memory circuit and the read out of the associated stored filter output from the addressed sampling and memory circuit at synchronized times in the plurality of reception channels.

3. Apparatus as claimed in claim 1, wherein said control means includes means for providing to each mixer a reference signal having a time-dependent phase relationship with respect to the associated transducer element signal.

4. Apparatus for processing signals, said apparatus comprising:

a plurality of groups of reception channels, each group of reception channels including a plurality of reception channels, each reception channel including a mixer for mixing a respective input signal with a time-controlled reference signal, a filter for filtering the mixed signals to produce a low frequency output, and a sampling and memory circuit for periodically sampling the filter output and storing the sampled filter output and for periodically reading out the stored filter output, each group of reception channels further including adding means for adding the read outputs from the plurality of sampling and memory circuits of respective channels to provide a group output, and a group memory for storing the group output;

control means for providing write addresses and read addresses for the plurality of sampling and memory circuits and the group memory of each of the plurality of groups of reception channels to cause an addressed sampling and memory circuit to sample and store the associated filter output and to read out the associated stored filter output, with a uniquely selected channel delay time between storing and reading out by that sampling and memory circuit, and to cause respective ones of the group memories to store the associated group output and to read out the associated stored group output with a uniquely selected group delay time between storing and reading out by that group memory, said control means further providing reference signals to the plurality of mixers, the reference signal for a respective mixer being dependent upon the selected channel delay time for that mixer; and further adding means for adding the read outputs from the plurality of group memories to provide a received signal.

5. Apparatus as claimed in claim 4, wherein said further adding means comprises a plurality of adders for cascading the read outputs from the plurality of group memories.

6. Apparatus as claimed in claim 4, wherein said further adding means comprises a plurality of adders for adding the read outputs from the plurality of group memories in parallel.

7. Apparatus as claimed in claim 6, wherein said control means includes means for providing to each mixer a reference signal having a time-dependent phase relationship with respect to the associated transducer element signal.

8. Apparatus as claimed in claim 4, wherein said control means includes means for providing to each mixer a reference signal having a time-dependent phase relationship with respect to the associated transducer element signal.

9. Apparatus as claimed in claim 4, wherein the control means includes clock means for providing clock signals to control the sampling and storing of the associated filter output in the addressed sampling and memory circuit and the read out of the associated stored filter output from the addressed sampling and memory circuit at synchronized times in the plurality of groups and to control the storing of the associated group output in the addressed group memory and the read out of the associated stored group output from the addressed group memory at synchronized times.

* * * * *